(12) United States Patent
Mason et al.

(10) Patent No.: US 12,323,410 B2
(45) Date of Patent: Jun. 3, 2025

(54) PASSWORD-LESS AUTHENTICATION STRUCTURE

(71) Applicant: ADP, Inc., Roseland, NJ (US)

(72) Inventors: James P Mason, Alpharetta, GA (US); Gregory Fincannon, Alpharetta, GA (US); Tushar Phondge, Morganville, NJ (US); Sonal Doshi, Basking Ridge, NJ (US); Neha Pahwa, Scarsdale, NY (US); Sanjoli Ahuja, Bridgewater, NJ (US); Gregory Murphy, Roswell, GA (US)

(73) Assignee: ADP, Inc., Roseland, NJ (US)

( * ) Notice: Subject to any disclaimer, the term of this patent is extended or adjusted under 35 U.S.C. 154(b) by 667 days.

(21) Appl. No.: 17/443,339

(22) Filed: Jul. 26, 2021

(65) Prior Publication Data

US 2023/0028416 A1    Jan. 26, 2023

(51) Int. Cl.
H04L 9/40    (2022.01)
(52) U.S. Cl.
CPC ........ H04L 63/083 (2013.01); H04L 63/0861 (2013.01); H04L 63/20 (2013.01)
(58) Field of Classification Search
CPC ... H04L 63/083; H04L 63/0861; H04L 63/20; H04L 63/0838; H04L 67/55
USPC .......................................................... 726/4
See application file for complete search history.

(56) References Cited

U.S. PATENT DOCUMENTS

| | | | | |
|---|---|---|---|---|
| 10,375,061 | B2 * | 8/2019 | Ogawa | G06F 21/31 |
| 11,115,410 | B1 * | 9/2021 | Hanson | H04L 63/0861 |
| 11,374,927 | B1 * | 6/2022 | Kaditz | H04L 63/0861 |
| 2018/0139199 | A1 * | 5/2018 | Ahuja | H04L 67/306 |
| 2018/0167373 | A1 * | 6/2018 | Anderson | H04W 4/80 |
| 2018/0234411 | A1 * | 8/2018 | Masiero | H04L 63/0853 |
| 2020/0034160 | A1 * | 1/2020 | Koren | H04L 67/10 |
| 2020/0050749 | A1 * | 2/2020 | Barboi | G06Q 20/341 |
| 2020/0236105 | A1 * | 7/2020 | Doshi | H04W 12/084 |
| 2020/0327219 | A1 * | 10/2020 | Bolimovsky | H04W 12/68 |
| 2021/0021996 | A1 * | 1/2021 | Li | H04W 4/021 |
| 2021/0081524 | A1 * | 3/2021 | Moon | G06F 21/46 |
| 2022/0158835 | A1 * | 5/2022 | Vedeshwar | H04L 9/0866 |
| 2022/0353256 | A1 * | 11/2022 | Cizer Kobrinsky | H04L 63/102 |
| 2023/0020703 | A1 * | 1/2023 | Padinjaruveetil | H04L 9/3226 |

* cited by examiner

*Primary Examiner* — Catherine Thiaw
*Assistant Examiner* — Nega Woldemariam
(74) *Attorney, Agent, or Firm* — Foley & Lardner LLP

(57) ABSTRACT

Embodiments present different password-less sign-in alternatives for selection by the user for a subsequent future login to the service provider account interface, and in response to determining that data inputs from a user satisfy associated data requests, enable the selected password-less sign-in alternative for a subsequent login of the user into the service provider account interface, wherein the subsequent login of the user into service provider account interface via the enabled selected password-less sign-in alternative does not require the user to enter the password.

20 Claims, 15 Drawing Sheets

PASSWORD-LESS AUTHENTICATION STRUCTURE

The present disclosure relates generally to an improved authentication system for a device and, in particular, to a method and system for securely authenticating access to a service provider account interface without requiring a password structure.

BACKGROUND

A wide variety of programmable devices including smartphones, tablets, personal computers (PCs), desktop PCs, and wearable fitness devices connect to service provider account interfaces via the Internet or other networking infrastructure. Users may thereby access a wide variety of personal, confidential or sensitive information of or associated to the user, including within employer data (payroll, benefits, etc.), financial account information, and healthcare insurance, providers, medical records and services rendered.

Users must typically verify their identify, and sometimes provide other credentials, to enable online account or information access to different service providers, such as employers, financial or governmental institutions, or other entities. Account service provider structures generally require users to individually provide different and unique usernames and passwords associated with each account. Managing the many different passwords and usernames required by different service providers may be difficult or cumbersome for users, and cause user dissatisfaction and time inefficiencies from delays caused when a user cannot quickly recall or provide the correct, specific password or username required for a given access.

Moreover, different account interfaces apply different username and password formulation requirements, reducing the ability of users to use common formats and schemes and thereby more easily recall a given password. For example, acceptable or required capitalization formats and symbols and combinations thereof for some account access structures are expressly forbidden by others. And some account access structures require regular, periodic changing of passwords. Accordingly, users must remember or otherwise retrieve a wide variety of different passwords and usernames in order to access different accounts, some of which are periodically aged-out and invalid until revised. Such complexities result in time inefficiencies, wherein the user loses time spent on retrieving passwords from their records when they cannot recall a given password correctly. Storing passwords for later retrieval also presents a risk of loss: for example, users may keep passwords written on notes placed on workstations for handy reference that are readily viewable to third parties, thereby comprising the security of the data accessed thereby.

Business opportunities may be lost to service providers and users when a user becomes dissatisfied or impatient or unable to comply with an account interface password or username requirement and terminates a transaction or account access request or rather than comply with said requirements. Such terminations result in wasted time of the user and a loss of a sale of goods or services by the service provider, or other loss of value to the user, such as a discounted price or account rebate that would have accrued to the user had the user completed a required password and username login.

SUMMARY

In one embodiment of the present invention, a method includes, in response to validating login of user into a service provider account interface via entry of password and identity credential, presenting a plurality of different password-less sign-in alternatives for selection by the user for a subsequent future login to the service provider account interface; in response to a selection by the user of a one of the plurality of different password-less sign-in alternatives, generating a first data request to the user that is associated to the selected one of the plurality of different password-less sign-in alternatives; determining whether a first data input received from the user in response to the first data request satisfies a requirement of the first data request; in response to determining that the first data input satisfies the first data request, enabling the selected password-less sign-in alternative for a subsequent login of the user into the service provider account interface, wherein the subsequent login of the user into service provider account interface via the enabled selected password-less sign-in alternative does not require the user to enter the password; and notifying the user to use the enabled selected password-less sign-in alternative for the subsequent login of the user into the service provider account interface.

In another embodiment, a system has a hardware processor in circuit communication with a computer readable memory and a computer-readable storage medium having program instructions stored thereon. The processor executes the program instructions stored on the computer-readable storage medium via the computer readable memory and thereby, in response to validating login of user into a service provider account interface via entry of password and identity credential, presents a plurality of different password-less sign-in alternatives for selection by the user for a subsequent future login to the service provider account interface; in response to a selection by the user of a one of the plurality of different password-less sign-in alternatives, generates a first data request to the user that is associated to the selected one of the plurality of different password-less sign-in alternatives; determines whether a first data input received from the user in response to the first data request satisfies a requirement of the first data request; in response to determining that the first data input satisfies the first data request, enables the selected password-less sign-in alternative for a subsequent login of the user into the service provider account interface, wherein the subsequent login of the user into service provider account interface via the enabled selected password-less sign-in alternative does not require the user to enter the password; and notifies the user to use the enabled selected password-less sign-in alternative for the subsequent login of the user into the service provider account interface.

In another embodiment, a computer program product has a computer-readable storage medium with computer readable program code embodied therewith. The computer readable program code includes instructions for execution which cause the processor to, in response to validating login of user into a service provider account interface via entry of password and identity credential, present a plurality of different password-less sign-in alternatives for selection by the user for a subsequent future login to the service provider account interface; in response to a selection by the user of a one of the plurality of different password-less sign-in alternatives, generate a first data request to the user that is associated to the selected one of the plurality of different password-less sign-in alternatives; determine whether a first data input received from the user in response to the first data request satisfies a requirement of the first data request; in response to determining that the first data input satisfies the first data request, enable the selected password-less sign-in alternative for a subsequent login of the user into the service provider account interface, wherein the subsequent login of the user into service provider account interface via the enabled selected password-less sign-in alternative does not require the user to enter the password; and notify the user to use the enabled selected password-less sign-in alternative for the subsequent login of the user into the service provider account interface.

BRIEF DESCRIPTION OF THE SEVERAL VIEWS OF THE DRAWINGS

These and other features of this invention will be more readily understood from the following detailed description of the various embodiments of the invention taken in conjunction with the accompanying drawings in which.

DETAILED DESCRIPTION

Figure 1:
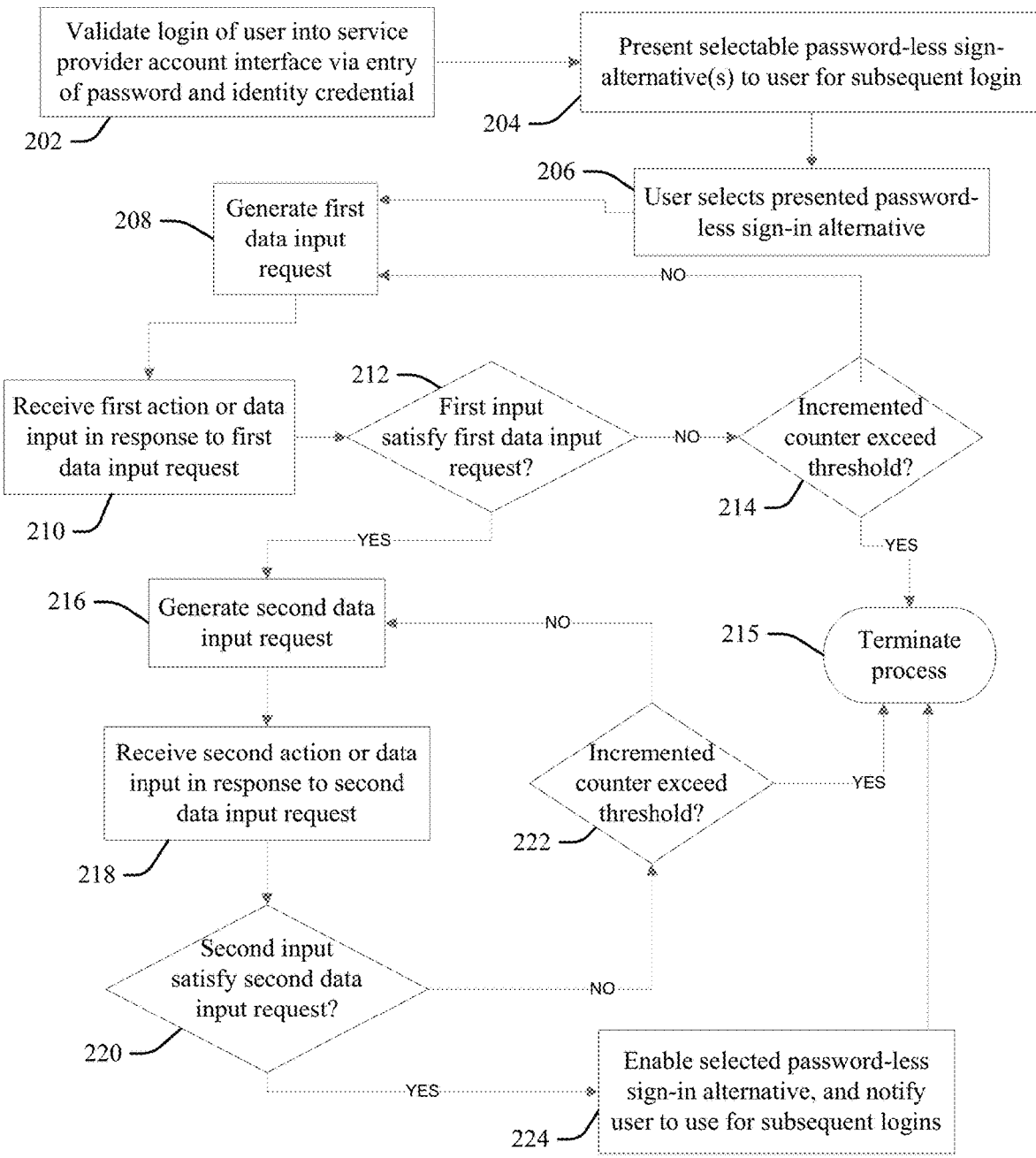
FIG. 1 is a flow chart illustration of a method or process aspect according to an embodiment of the present invention.

FIG. 1 illustrates an embodiment according to the present invention. At 202 a user successfully enters into a service provider account interface a unique password and associated unique identify access credentials (for example, types in an alphanumeric string user identification (ID), inserts a keyed dongle or device into a universal serial bus (USB) port, presents their face to a camera, or places a finger on a fingerprint reader, etc.).

In response to the entry at 202, at 204 a device processor configured according to the present invention (the "configured processor") presents at least one different "password-less" sign-in alternative for selection by the user for a future, subsequent login to the interface. For example, the configured processor sends a text message or audio message to a smart phone of the user or drives a display device (a smart phone or wearable device screen, a display connected to personal computer, etc.) to generate a list of password-less sign-in alternatives in a graphical user interface (GUI) window that are each selectable by the user. The term "password-less" signifies that each of the alternatives enable the user to gain access to the service provider account through the interface in subsequent entry attempts via alternative structures that do not require that the user provide a password, as more fully explained below.

At 206 the user selects one of the one or more, different password-less sign-in alternatives presented at 204. Illustrative but not exhaustive examples of selection include through a GUI mouse cursor selection, a fingertip or stylus selection through a touch screen interface, a voice input through a microphone naming or reciting one of a list of different names or terms or items distinguished by different alphanumeric codes, and an eye movement or gaze direction or gesture input or unique brainwave pattern detected or recognized by a camera, biophysical scanner or other input device.

In response to a selection at 206 of one of the different password-less sign-in alternatives, at 208 the configured processor generates a first data input request to the user or to another networked system or application to provide a first information input that is required to enable the selected password-less sign-in alternative. For example, the configured processor presents (drives the display device, transmit an audio or text message, etc.) a first GUI data input request to the user that requires that the user responsively take a first action or provide a first information input that is required to enable the selected password-less sign-in alternative. Thus, the configured processor may drive the display to present a first GUI data input window that includes a field for user population of alphanumeric string data, or selectable displays thereof, and illustrative but not exhaustive examples of presentation actions include display of Quick Response (QR) code displays, USB device Personal Identification Number ("PIN") code fields, user telephone numbers, email addresses. Illustrative but not exhaustive examples of a first data input action requested by the user include opening an interactive application ("app") on the display for engagement by the user and selecting a radio button or enabling a widget that causes the service provider account interface to generate a telephone call or text message to an identified or designated telephone number or send an email to an identified or designated email address associate to the user. Some embodiments directly contact or exchange data with another networked system or application, for example send a link to a mail application for incorporation within a message window for presentment to the user, to prompt the user to provide an input or take an action required to enable the selected password-less sign-in alternative.

At 210 the configured processor receives first action or data input in response to first data input request. In one embodiment the user takes the action or provides a data input in response to the first information input requirement/request at 208, though the response may come from another system or application.

At 212 the configured processor determines whether said action or data input at 210 satisfies the first information input requirement/request: if not, at 214 the configured processor increments an attempt counter and returns for another iteration at 208, unless the attempt counter has reached a threshold number of unsatisfactory attempts, wherein the configured processor terminates the process at 215, which may optionally displays a message to the user of the termination of the current process (for example, "You have entered too many incorrect responses; please contact your administrator for assistance to proceed").

In response to determining at 212 that the first action or data input at 210 satisfies the first information input requirement/request, at 216 the configured processor generates a second data input request. In one embodiment the configured processor drives the display device to present a second GUI data input display or action that requires that the user responsively take a second action or provide a second information input that is required to enable the selected password-less sign-in alternative. The second GUI data input display may include fields for user population of alphanumeric string data, or selectable displays thereof, as discussed above with respect to 208. Second GUI data input actions may include further engagement with an app opened at 208, or with another, different app; and answering or confirming receipt of a telephone call, text message or email generated in response to a satisfactory input at 210 to the identified or designated telephone number or email address associated to the user.

At 218 the configured processor receives second action or data input in response to second data input request. In some embodiments the received second action or input is another (second) action taken by the user, or another (second) data input provided by the user in response to the second information input requirement/request at 216. At 220 the configured processor determines whether said second action or data input at 218 satisfies the second information input requirement/request, including via examples similar to those discussed with respect to 212: if not, at 222 the configured processor increments an attempt counter and returns for another iteration at 216, unless the attempt counter has reached a threshold number of unsatisfactory attempts, wherein the configured processor terminates the process at 215, and optionally displays a message to the user of the termination of the current process, including as discussed above.

In response to determining at 220 that the second user action or data input at 218 satisfies the second information input requirement/request, at 224 the configured processor enables selected password-less sign-in alternative for subsequent account access in association with the user, and notifies the user (for example, drives the display device to present a message, sends a text, voice mail or email message, etc.) that they have changed their log-in procedures for subsequent log-in attempts from the password process executed at 202 to the selected password-less sign-in alternative, and terminates the process at 215. Thus, each subsequent log-in attempt by this same user will evoke the selected password-less sign-in alternative. Accordingly, when the user again engages the service provider account interface to access his or her account information, the service provider account interface will evoke the selected password-less sign-in alternative process to engage the user and enable access to the account.

The embodiment of FIG. 1 provides a multi-factor process, wherein both of the first and the second user actions or inputs must be satisfactorily executed (as determined at 212 and 220) in order to enable use of the selected the password-less sign-in alternative for the user via the service provider account interface. As multi-factor processes provide enhanced security over fraudulent account access attempts relative to single-factor processes, the present embodiment may provide enhanced security relative to a replaced password-based log-in process used for access at 202, via with the alternate, password-less process selected at 206.

Alternative embodiments may omit the second data input requirements (the process elements 216, 218, 220 and 222), and at 224 enable the selected password-less sign-in alternative, and notify the user accordingly, directly upon determination at 212 that the received first input satisfies the first data input request.

Figure 2:
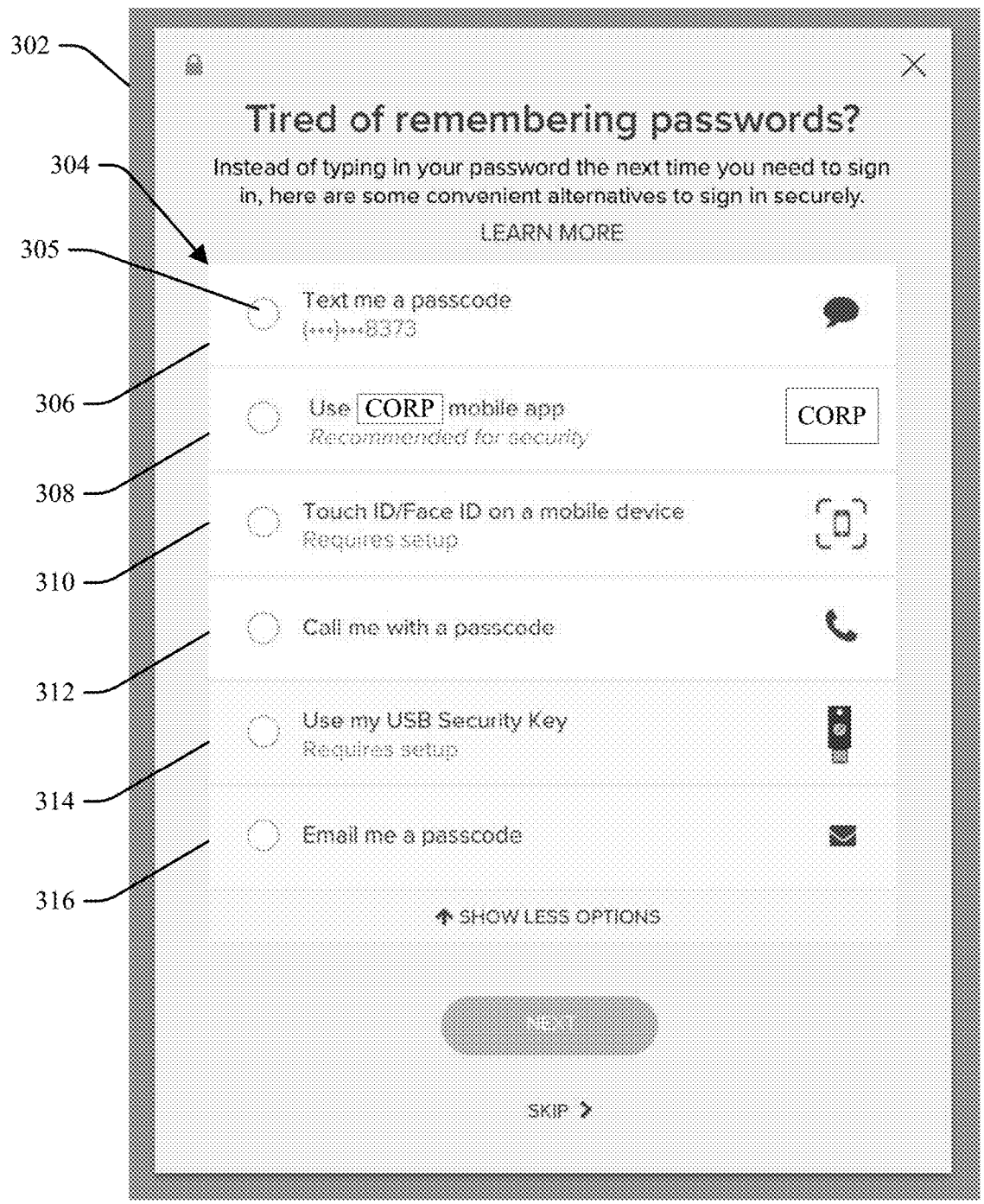
FIG. 2 is a graphic illustration of an embodiment of the present invention.

FIG. 2 is a graphic illustration of one embodiment of a presentment (at 204 of FIG. 1) of a GUI window 302 that comprises a set or plurality 304 of (six) different "password-less" sign-in alternative process options that are enabled for selection by the user via their different respective GUI radio button fields 305 for replacement of a password-based sign-in (at 206 FIG. 1): a text a passcode sign in 306, use a service provider entity ("CORP") mobile app 308, use a biometric ("Touch ID/Face ID") authentication structure on a user's mobile device 310, call me with a passcode 312, use a USB security key 314, and email me a passcode 316. The embodiment presents the window 302 to a user on a GUI display device appears after the user successfully enters their user ID and password at 202 of FIG. 1, and functions as a launching point to enable one of the password-less sign in alternatives 304. The list 304 is illustrative but not exhaustive, and some embodiment may present more or less than six alternatives for selection.

Figure 3:
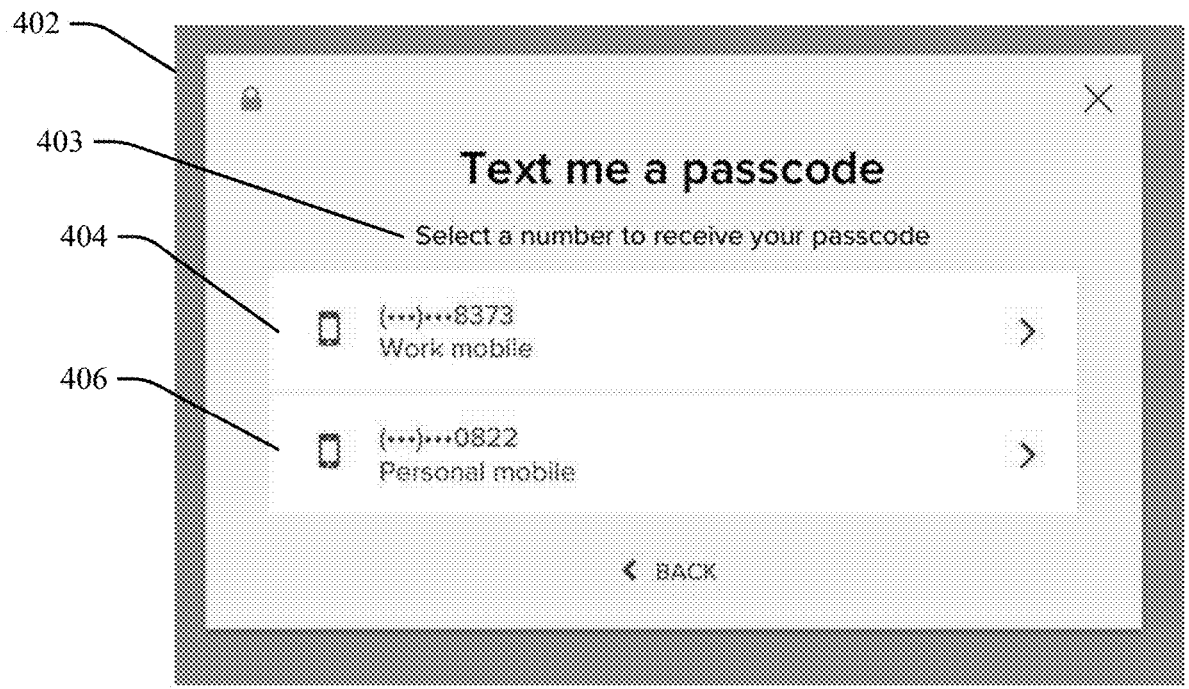
FIG. 3 is a graphic illustration of an embodiment of the present invention.
Figure 3:
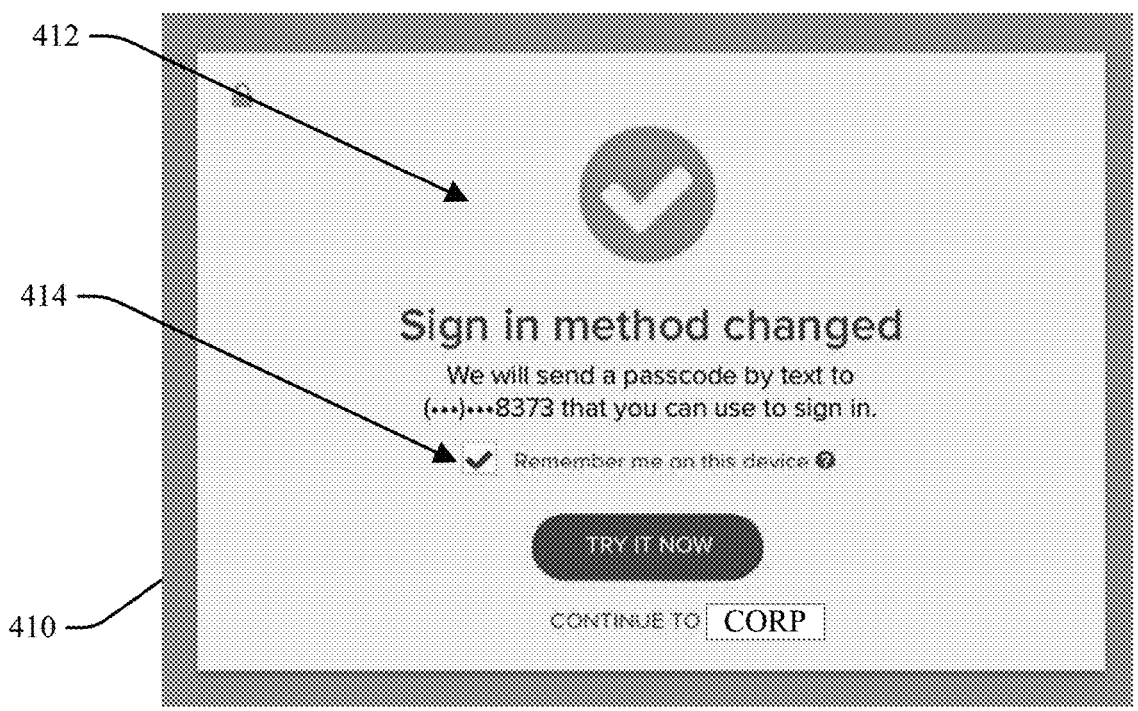

FIG. 3 is a graphic illustration of one embodiment of an enablement of the "text a passcode sign in" password-less sign-in alternative 306 (FIG. 2) and includes a first GUI data input request window 402 that the configured processor presents (at FIG. 1 208) in response to a selection by a user (at FIG. 1 206) of the "text a passcode sign in" password-less sign-in alternative 306 presented (at FIG. 1 204) in window 302 of FIG. 2. The window 402 comprises a first data input request 403 to select between two different mobile numbers that the configured processor retrieves and populates into the window 402 as respective, GUI-selectable items 404 and 406.

The configured processor presents window 410 (at 224 FIG. 1) in response to the user selecting the "work mobile" item 404 as a first data input (at 210 FIG. 1), and to determining that the first data input satisfies the first information input request (at 212 FIG. 1), and further that any second action or input by the user (at 218 FIG. 1) satisfies an associated second data or action request (at 220 FIG. 1) for embodiments that include these optional steps or processes. The confirmation window 412 includes confirming graphical text and icon notice 412 to the user that the password sign-in method has been changed to the "text a passcode sign in" password-less sign-in alternative 306, and that the work mobile number identified in item 404 and selected by the user will be utilized in the alternative process 306.

The window 410 also includes a selectable option 414 to save authorization credentials on the user's mobile device used to engage the window 410, to provide further enhanced security attributes and log-in efficiencies. In some embodiments, in response the user checking the box 414 the configured processor utilizes the selection as a satisfactory second action input at 218 FIG. 1, to enable quicker and more secure logins during future iterations of use of the "text a passcode sign in" password-less sign-in alternative 306, as well as with others of the alternatives 304.

Figure 4:
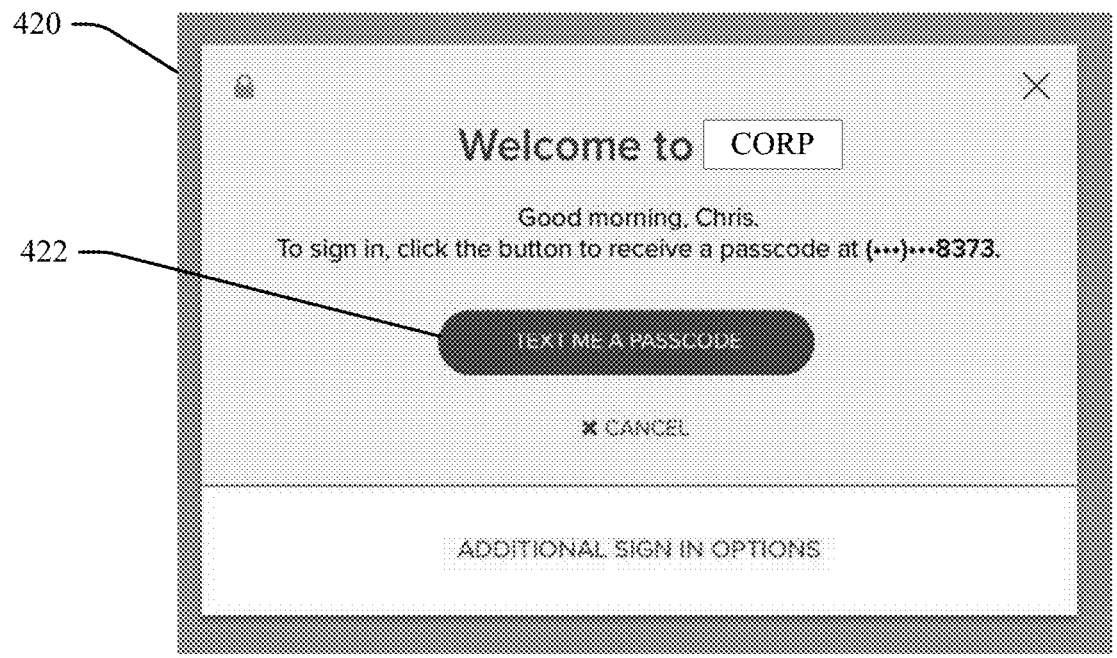
FIG. 4 is a graphic illustration of an embodiment of the present invention.
Figure 4:
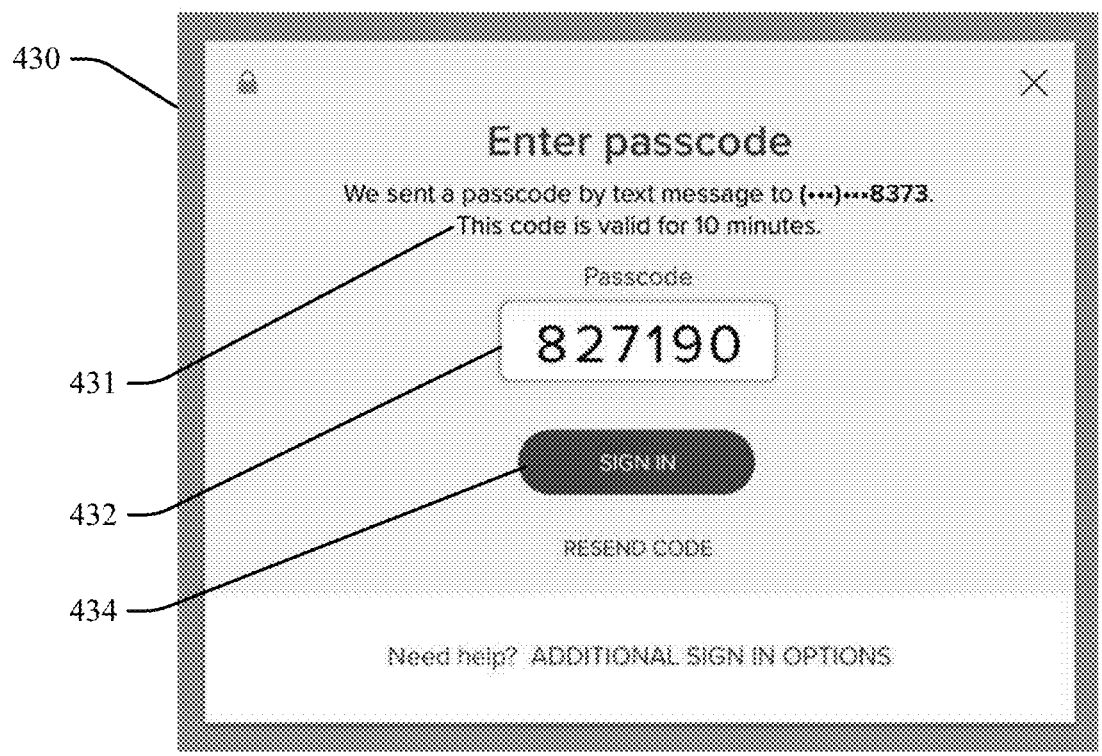

FIG. 4 is a graphic illustration of use of the enabled "text a passcode sign in" password-less sign-in alternative 306 and includes a window 420 that the configured processor presents to a user in response to subsequent login request from the user to access a service provider account interface for which the user has selected the "text a passcode sign in" password-less sign-in alternative 306 (at FIG. 1 204), as confirmed in window 410 of FIG. 3. Thus, in response to the user selecting the "text me a passcode" button 422 via a GUI routine, the configured processor texts a temporary passcode "827190" to the indicated "work mobile" telephone number ending in "8373," and presents the "enter passcode" window 430 to the user, indicating that the temporary passcode will lapse if not used within a specified time period 431 of ten (10) minutes. Thus, the user is enabled to gain access to the access a service provider account interface without requiring entry of any password, but instead by populating the field box 432 with the passcode and selecting the "sign in" button 434.

Figure 5:
FIG. 5 is a graphic illustration of an embodiment of the present invention.
Figure 5:
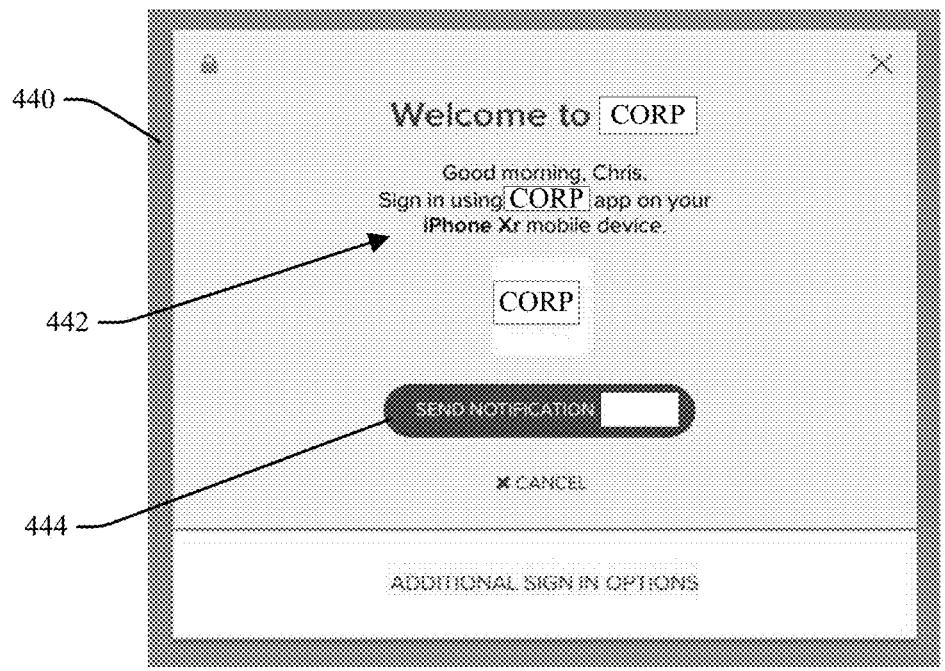

FIG. 5 includes a graphic illustration of GUI display 436 of an enablement of the CORP mobile app alternative 308, comprising a confirmation screen generated by the configured processor to confirm that a user has selected (at FIG. 1 206) the service provider entity CORP mobile app alternative 308 presented (at FIG. 1 204) in window 302 of FIG. 2. The window 436 comprises confirming graphical text and icon content 437 that conveys to the user that the password sign-in method has been changed to the CORP mobile app alternative 308, and also includes a selectable option 438 to save authorization credentials on the user's mobile device, to provide further enhanced security attributes and log-in efficiencies. In some embodiments, in response to the user checking the box 438 the configured processor utilizes the selection as a satisfactory second action input at 218 FIG. 1, to enable quicker and more secure logins during future iterations of use of the CORP mobile app alternative 308, as well as with others of the alternatives 304.

Window 440 illustrates use of the enabled CORP mobile app alternative 308. Thus, in response to a subsequent log-in request by the user, the configured processor drives a GUI display to present window 440 that comprises instructions 442 for the user to use the CORP mobile app on a mobile device of the user, and also a "send notification to app" button 444. In response to the user engaging the "send notification to app" button 444 via a GUI routine, the configured processor sends a requisite code to the CORP mobile app to authorize the user to access the associated service provider account via the CORP mobile app.

Figure 6:
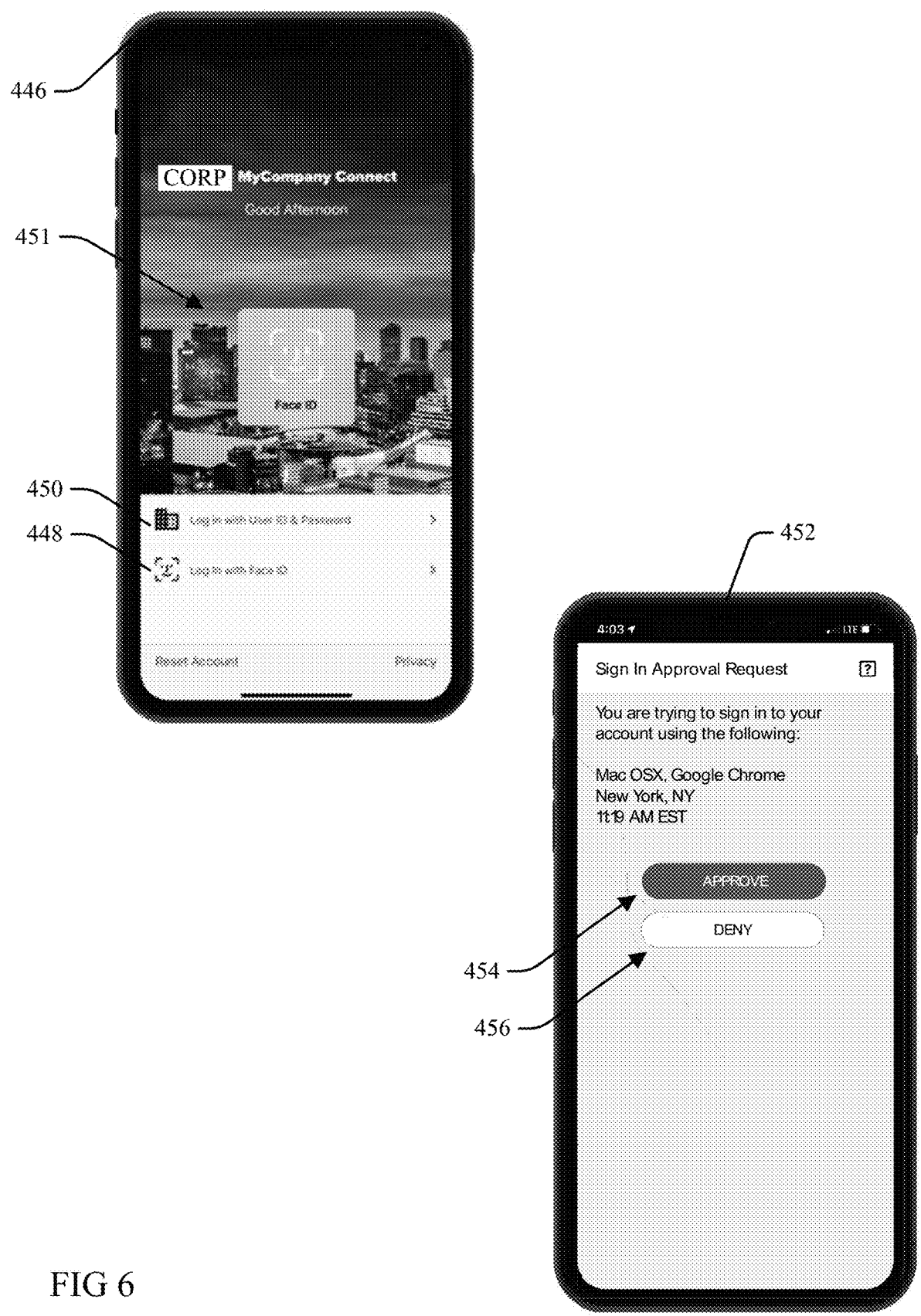
FIG. 6 is a graphic illustration of an embodiment of the present invention.

FIG. 6 further illustrates use of the enabled CORP mobile app alternative 308, displaying a start-up screen 446 of the CORP mobile app as displayed on a user's mobile phone screen, wherein the user is enabled to log in to the app via a native biometric routine 448 (through a camera device of the mobile phone using a "face ID" recognition process) that authenticates an identity indicia of the user, or through an app user ID and password routine 450. In the present example the user uses the biometric routine 448 to enter or otherwise respond to the CORP mobile app, as indicated by the "face ID" icon 451 displayed within the start-up screen 446.

In response to successful entry into or opening of the CORP mobile app, the configured processor drives the mobile phone screen to display app window 452, wherein the user must confirm that they wish to sign into the service provider account via the CORP mobile app (without the usual password routine) by engaging (via a GUI routine) an APPROVE button 454, wherein they will be granted access to the account. Alternatively, the user may decline to confirm or authorize access to the account by the CORP mobile app, via engaging the "DENY" button 456.

Figure 7:
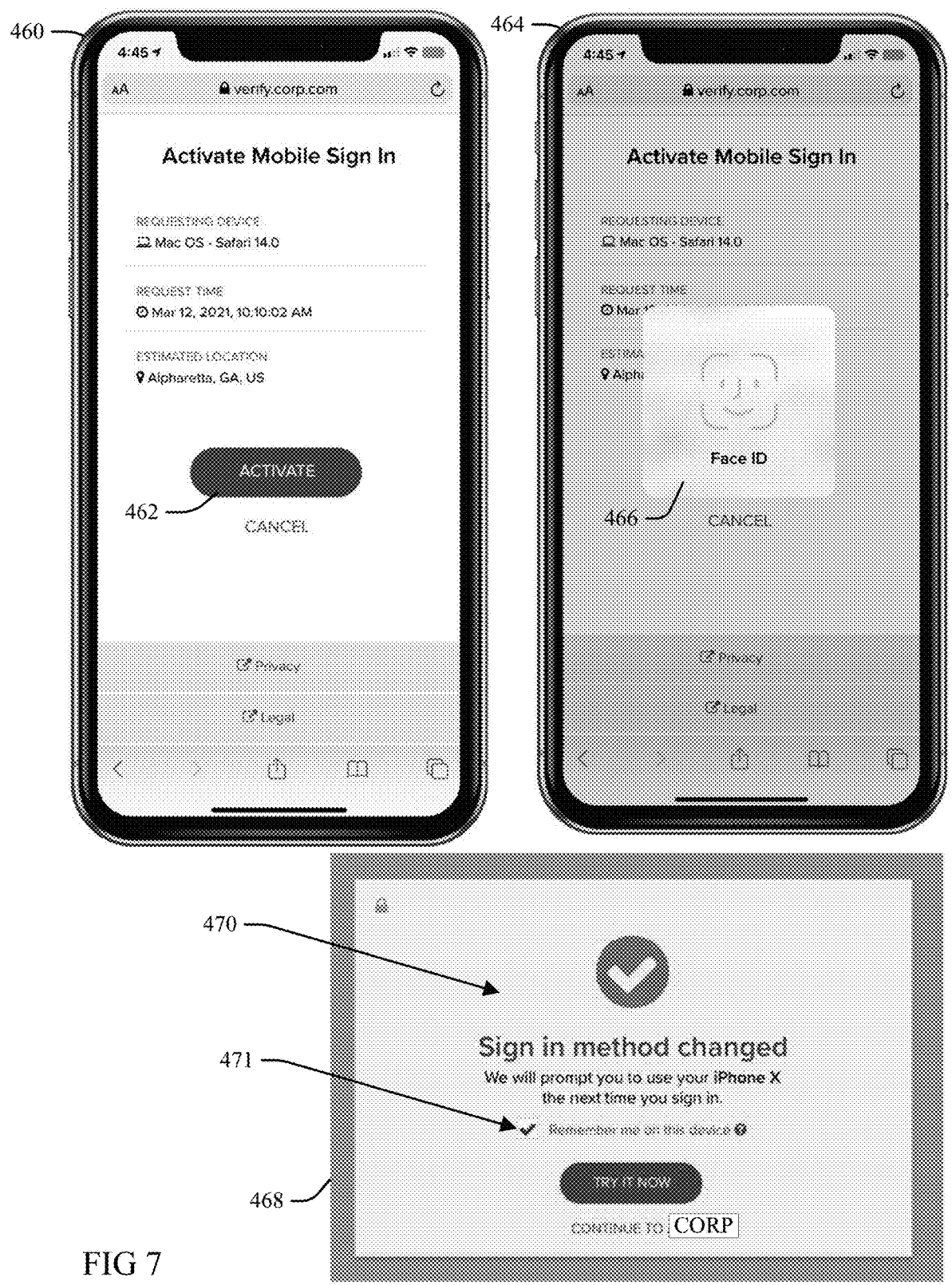
FIG. 7 is a graphic illustration of an embodiment of the present invention.

FIG. 7 is a graphic illustration of enablement of the mobile device authentication structure alternative 310, wherein in response to the selection of the alternative 310 by the user (at FIG. 1 206) the configured processor sends a text message that comprise a link to the mobile phone of the user as the first data input request (at 208 FIG. 1), wherein selection of the link by the user causes the user's mobile device to generate the window 460 which requests the user to select the "ACTIVE" button 462 as the first data input (at 210 FIG. 1).

In response to selection of the "ACTIVATE" button 462 by the user, the configured processor acquires authentication of the identity of the user as the second data input (at 218 FIG. 1) from a native authentication structure of the user's mobile device: for example, display window 464 shows that the user's phone has successfully identified the user using a "Face ID" process 466. Accordingly, (at 224 FIG. 1) the configured processor enables the mobile device authentication structure alternative 310 and generates and displays the window 468 that includes confirming graphical text and icon notice 470 to the user that the password sign-in method has been changed to the mobile device authentication structure alternative 310, which includes directions to use the same mobile device for a subsequent account login. Embodiments may also include a selectable option 471 to save authorization credentials on the mobile device, to provide further enhanced security attributes and log-in efficiencies.

Figure 8:
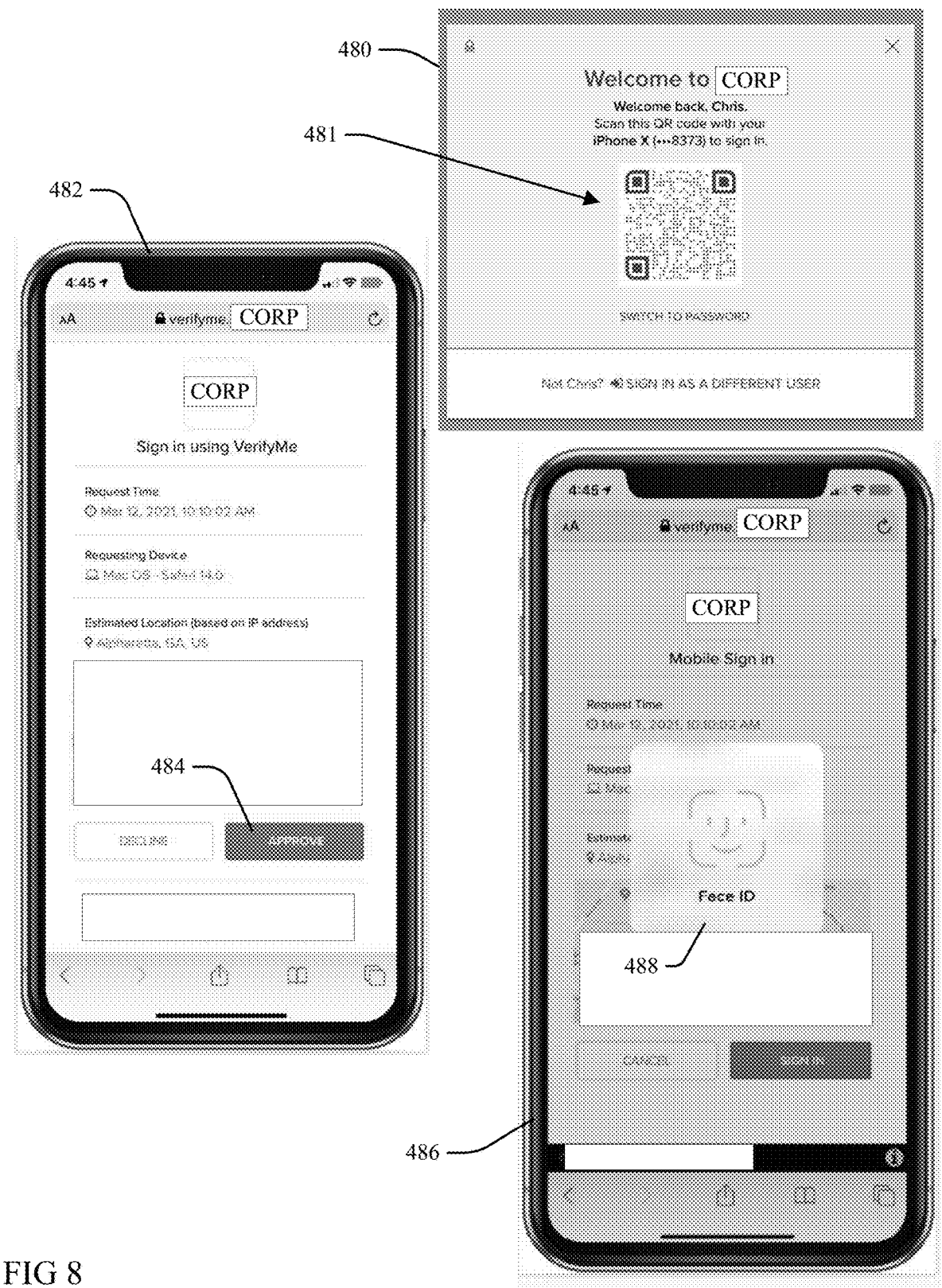
FIG. 8 is a graphic illustration of an embodiment of the present invention.

FIG. 8 is a graphic illustration of use of the mobile device authentication structure alternative 310 enabled as discussed with respect to FIG. 7, wherein the configured processor transmits window 480 for display within the mobile device or other programmable device of the user, the window 480 including a uniform resource location (URL) Quick Response (QR) code 481 for scanning or other input into the user's mobile device used to enable the alternative option 310. Scanning the QR code 481 (for example, via a mobile device camera, or as read directly by a browser or other application of the device) causes browser of the mobile device to navigate to the "Sign in using VerifyMe" page 482 found at the URL, which presents an "APPROVE" hyperlink 484. Upon selection of the "APPROVE" hyperlink 484 by the user, the configured processor navigates to the "Mobile Sign In" page display window 486 and uses the native authentication structure of the user's mobile device (the "Face ID" process 488) to approve sign in of the user to the service provider account via mobile sign in.

Figure 9:
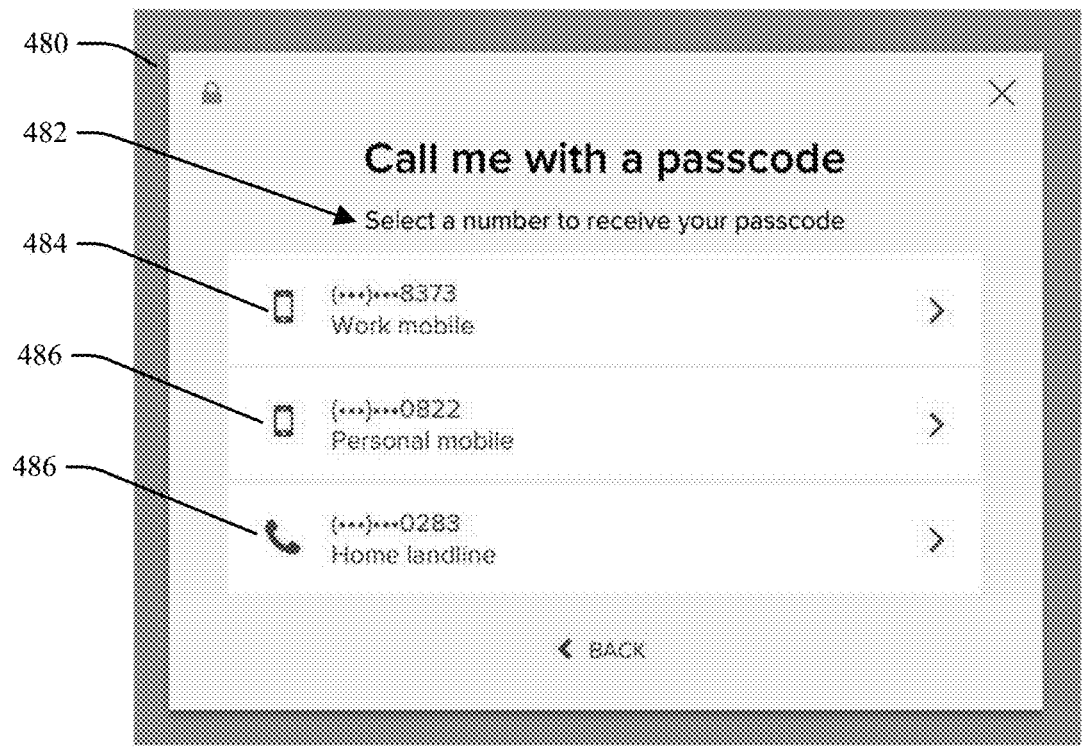
FIG. 9 is a graphic illustration of an embodiment of the present invention.
Figure 9:
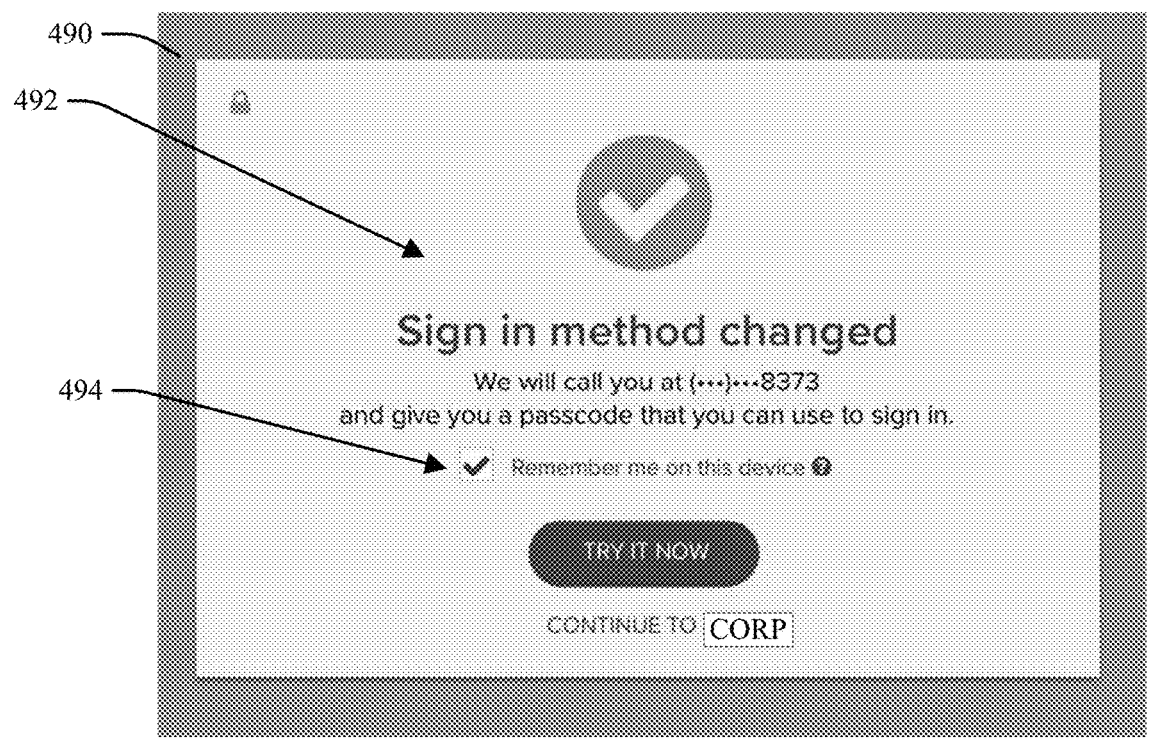

FIG. 9 is a graphic illustration of one embodiment of an enablement of the "call me with a passcode" password-less sign-in alternative 312 that includes a first GUI data input request window 480 that the configured processor presents (at FIG. 1 208) in response to a selection by a user (at FIG. 1 206) of the call me with a passcode" alternative 312 presented (at FIG. 1 204) in window 302 of FIG. 2. The window 480 comprises a first data input request 482 to select between three different telephone numbers that the configured processor retrieves as associated to the user and populates into the window 402 as respective, GUI-selectable items 484, 486 and 488.

The configured processor presents window 490 (at 224 FIG. 1) in response to the user selecting the "work mobile" item 484 as a first data input (at 210 FIG. 1), and to determining that the first data input satisfies the first information input request (at 212 FIG. 1), and further that any second action or input by the user (at 218 FIG. 1) satisfies an associated second data or action request (at 220 FIG. 1) for embodiments that include these optional steps or processes. The confirmation window 490 includes confirming graphical text and icon notice 492 to the user that the password sign-in method has been changed to the "call me with a passcode" password-less sign-in alternative 312, and that the work mobile number identified in item 484 and selected by the user will be utilized in the alternative process 312.

The window 490 also includes a selectable option 494 to save authorization credentials on the user's mobile device used to engage the window 490, to provide further enhanced security attributes and log-in efficiencies. In some embodiments, in response the user checking the box 494 the configured processor utilizes the selection as a satisfactory second action input at 218 FIG. 1, to enable quicker and more secure log-ins future during future iterations of use of the "call me with a passcode" password-less sign-in alternative 312, as well as with others of the alternatives 304.

Figure 10:
FIG. 10 is a graphic illustration of an embodiment of the present invention.
Figure 10:
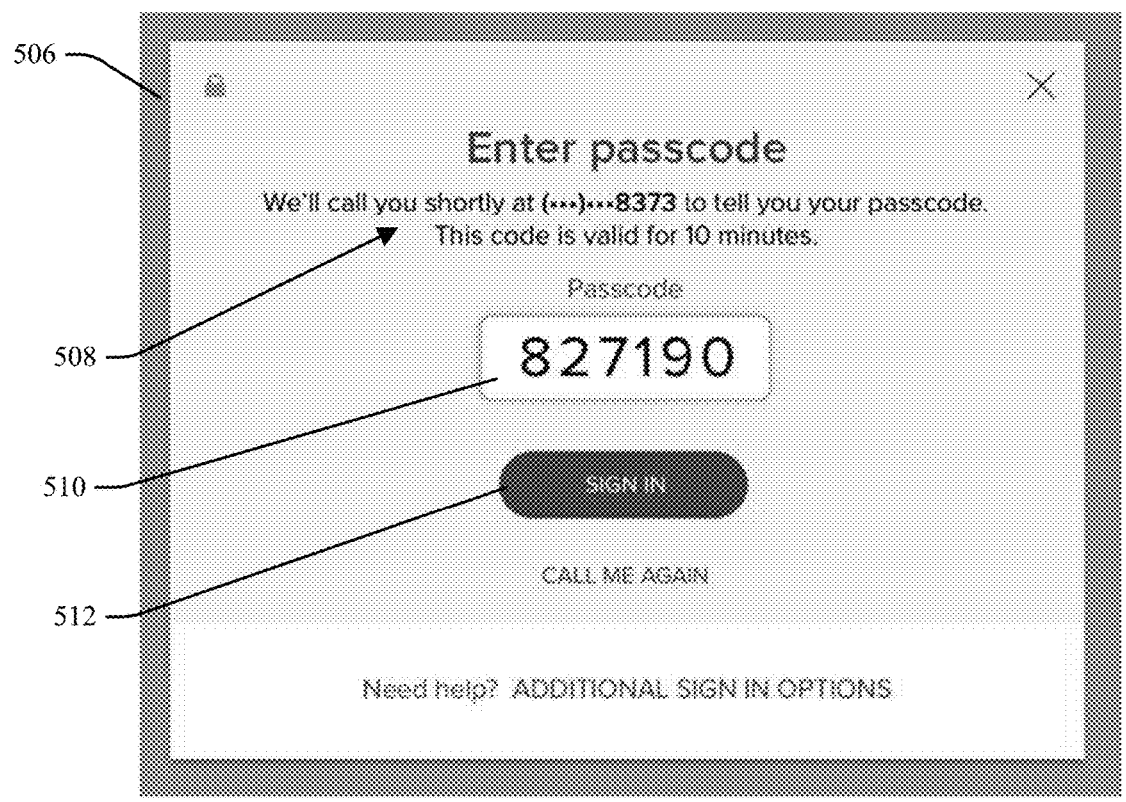

FIG. 10 is a graphic illustration of use of the enabled "call me with a passcode" password-less sign-in alternative 312. The configured processor presents a window 500 to a user in response to subsequent login request from the user to access a service provider account interface, the window including information 502 that informs the user that they have selected the "call me with a passcode" password-less sign-in alternative 312 via the mobile number ending in "8373" (the work mobile number identified in item 484). Thus, in response to the user selecting the "call me" button 504 via a GUI routine, the configured processor initiates an automated telephone call to the indicated "work mobile" telephone number ending in "8373" that includes an audio message containing a recitation of the temporary passcode "827190" and presents window 506 to the user which notifies the user of the incoming call via information text 508, which further indicates that the temporary passcode will lapse if not used within a specified time period of ten (10) minutes. Thus, the user is enabled to gain access to the access a service provider account interface without requiring entry of any password, but instead by populating the field box 510 with the passcode and selecting the "sign in" button 512.

Figure 11:
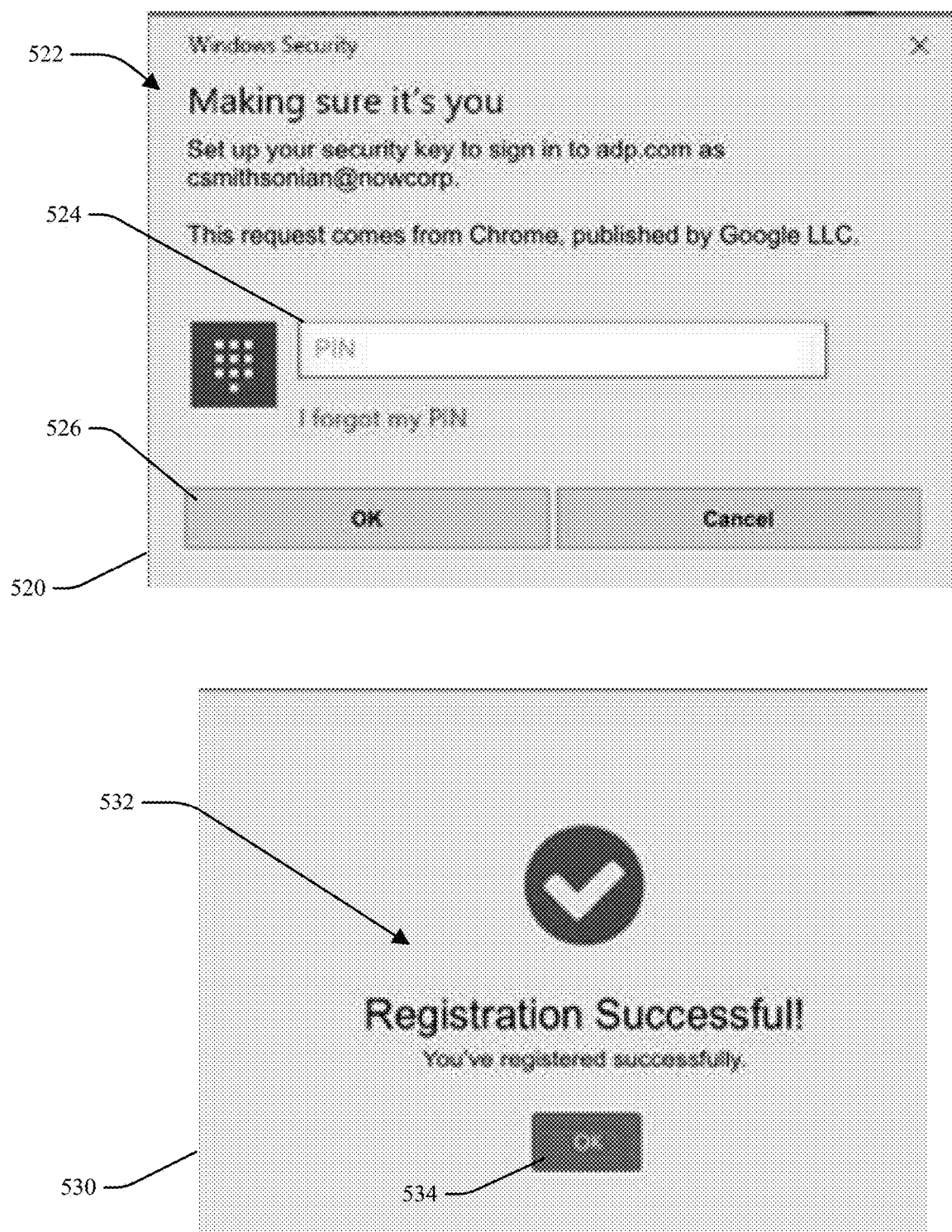
FIG. 11 is a graphic illustration of an embodiment of the present invention.

FIG. 11 is a graphic illustration of enablement of the USB security key alternate 314, wherein in response to the selection of the USB security key alternate 314 by the user (at FIG. 1 206) the configured processor uses an output of a native USB security application process of the USB device that verifies that the user is authorized to use the universal serial bus device as the first data input (at 208 FIG. 1), for example presenting a window 520 including directions 522 for the user to enter their USB device PIN into a "PIN" field 524 as the first data input request; and wherein the user engaging the "OK" button 526 via a GUI routine may provide the second data input (at 218 FIG. 1) required to enable the USB security key alternate option. The configured processor then presents confirmation screen 530 that includes confirmation text information 532 as to success of the USB security key alternate option 314 enablement. The confirmation screen may also include an "OK" button 534, wherein engaging the "OK" button 534 via a GUI routine may close the window, and in some embodiment provides the second data input (at 218 FIG. 1) required to enable the USB security key alternate option.

Figure 12:
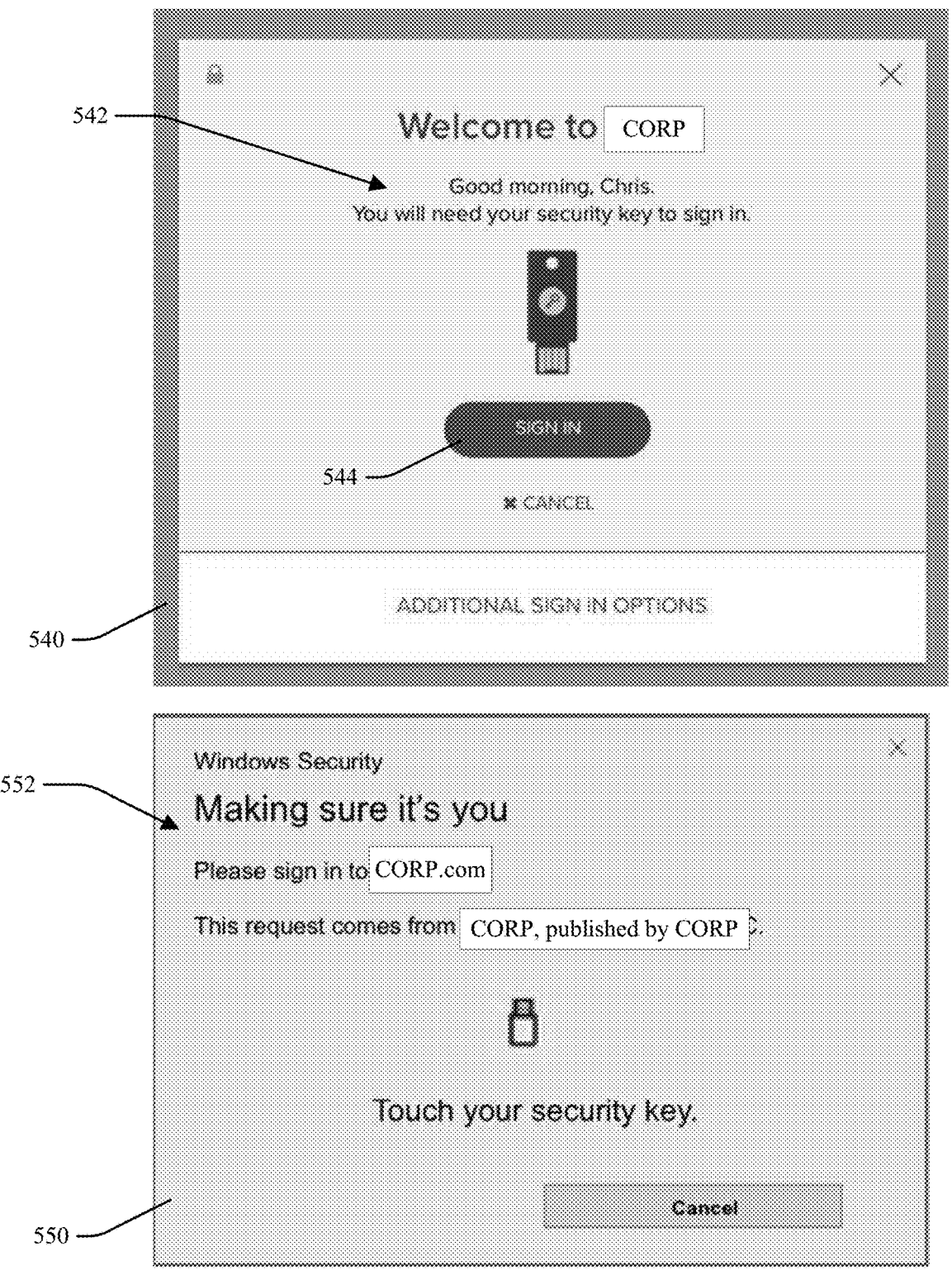
FIG. 12 is a graphic illustration of an embodiment of the present invention.

FIG. 12 is a graphic illustration of use of the USB security key alternate 314, wherein the configured processor transmits window 540 for display to the user that includes directions 542 to the user to insert the USB device registered as discussed with respect to FIG. 11 into a USB port of the programmable device from which the user is requesting access to the associated account. The user must also engage the "SIGN IN" button 544 via a GUI routine to proceed with the sign in request, wherein in response the configured processor presents the verification window 550. The verification window 550 includes instructions 552 for the user execute to verify that the user is authorized to use the USB key in order to gain the requested account access, to thereby generate an output from the native security application of the USB device that verifies that the user is authorized to use the device: illustrative but not exhaustive examples of instructions and associated actions include sign in to their entity ("CORP") account, enter their USB device PIN, and use a touch or other biometric function of the USB key device to verify user identity.

Figure 13:
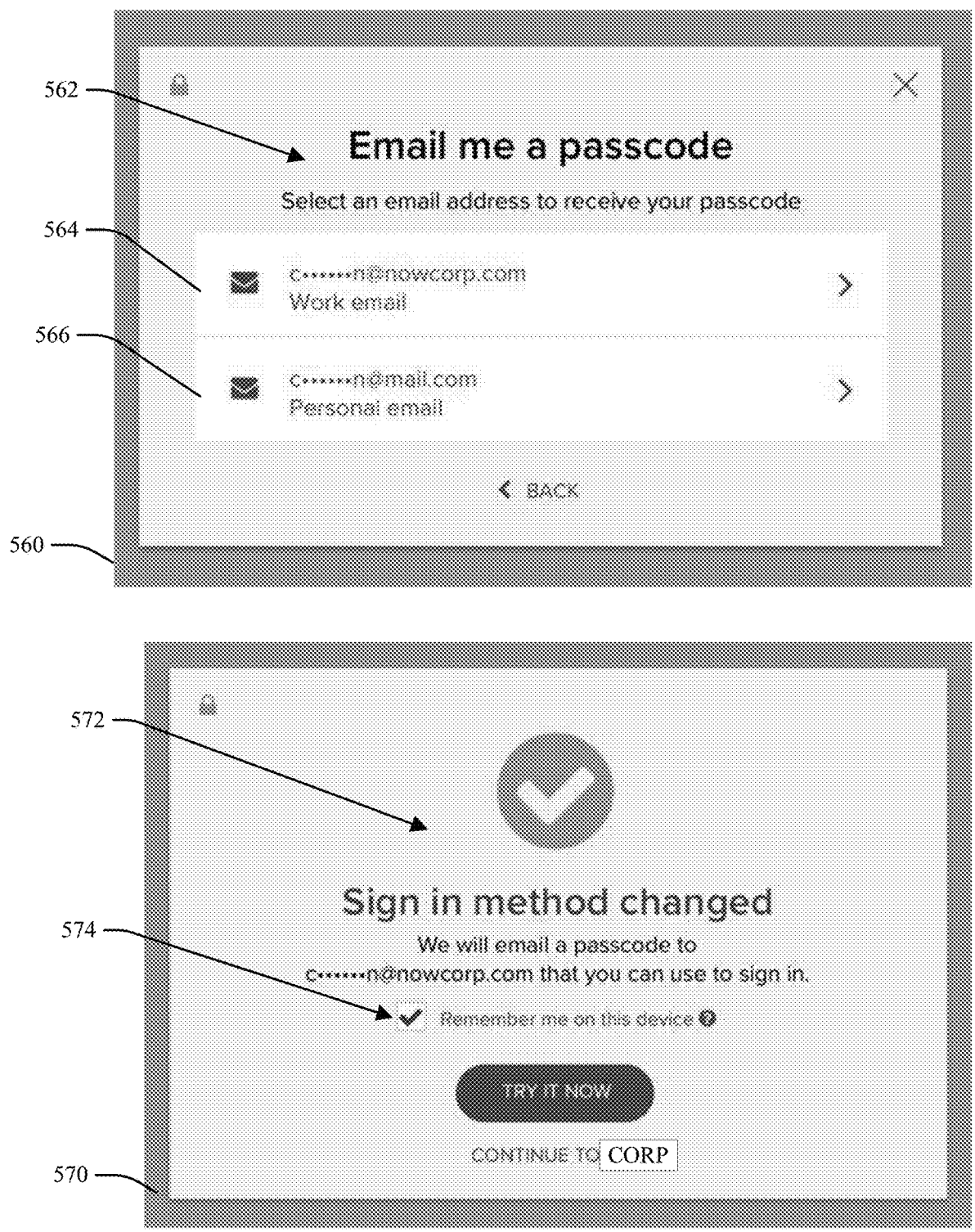
FIG. 13 is a graphic illustration of an embodiment of the present invention.

FIG. 13 is a graphic illustration of one embodiment of an enablement of the "email me a passcode" option 316 that includes a first GUI data input request window 560 that the configured processor presents (at FIG. 1 208) in response to a selection by a user (at FIG. 1 206) of the "email me a passcode" option 316 presented (at FIG. 1 204) in window 302 of FIG. 2. The window 560 comprises a first data input request 562 to select between two different email addresses that the configured processor retrieves as associated to the user and populates into the window 562 as respective, GUI-selectable items 564 and 566.

The configured processor presents window 570 (at 224 FIG. 1) in response to the user selecting the "work email" item 564 as a first data input (at 210 FIG. 1), and to determining that the first data input satisfies the first information input request (at 212 FIG. 1), and further that any second action or input by the user (at 218 FIG. 1) satisfies an associated second data or action request (at 220 FIG. 1) for embodiments that include these optional steps or processes. The confirmation window 570 includes confirming graphical text and icon notice 572 to the user that the password sign-in method has been changed to the "email me a passcode" option 316, and that the work email address identified in item 564 and selected by the user will be utilized in the alternative "email me a passcode" option 316.

The window 570 also includes a selectable option 574 to save authorization credentials on the user's mobile device used to engage the window 570, to provide further enhanced security attributes and log-in efficiencies. In some embodiments, in response the user checking the box 574 the configured processor utilizes the selection as a satisfactory second action input at 218 FIG. 1, to enable quicker and more secure logins during future iterations of use of the "email me a passcode" option 316, as well as with others of the alternatives 304.

Figure 14:
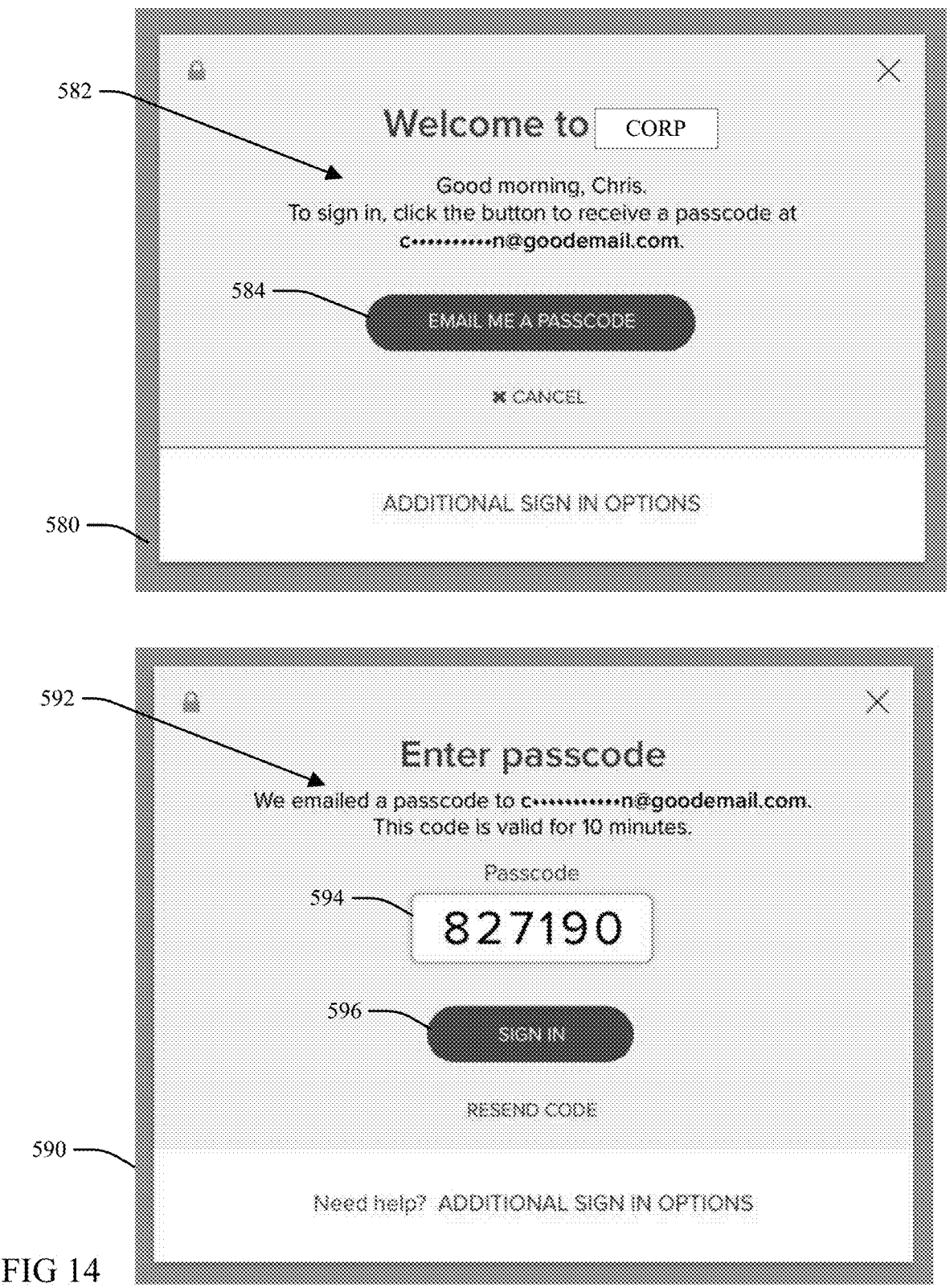
FIG. 14 is a graphic illustration of an embodiment of the present invention.

FIG. 14 is a graphic illustration of use of the "email me a passcode" option 316 enabled as discussed with respect to FIG. 13. The configured processor presents a window 580 to a user in response to subsequent log-in request from the user to access a service provider account interface, the window including information 582 that informs the user that they have selected the "email me a passcode" option 316 for use with the designated "work email" address (as identified and selected in item 564). Thus, in response to the user selecting the "email me a passcode" button 584 via a GUI routine, the configured processor generates and sends an email or other data communication file the designated email address that includes data representative of the temporary passcode "827190", and further presents passcode entry window 590 to the user.

The passcode entry window 590 includes information 592 that instructs the user to populate a "passcode" field 594 with the passcode sent to the designated email address, and further indicates that the temporary passcode will lapse if not used within a specified time period of ten (10) minutes. Thus, the user is enabled to gain access to the access a service provider account interface without requiring entry of any password, but instead by populating the field box 594 with the passcode and selecting the "sign in" button 596 via a GUI routine.

Figure 15:
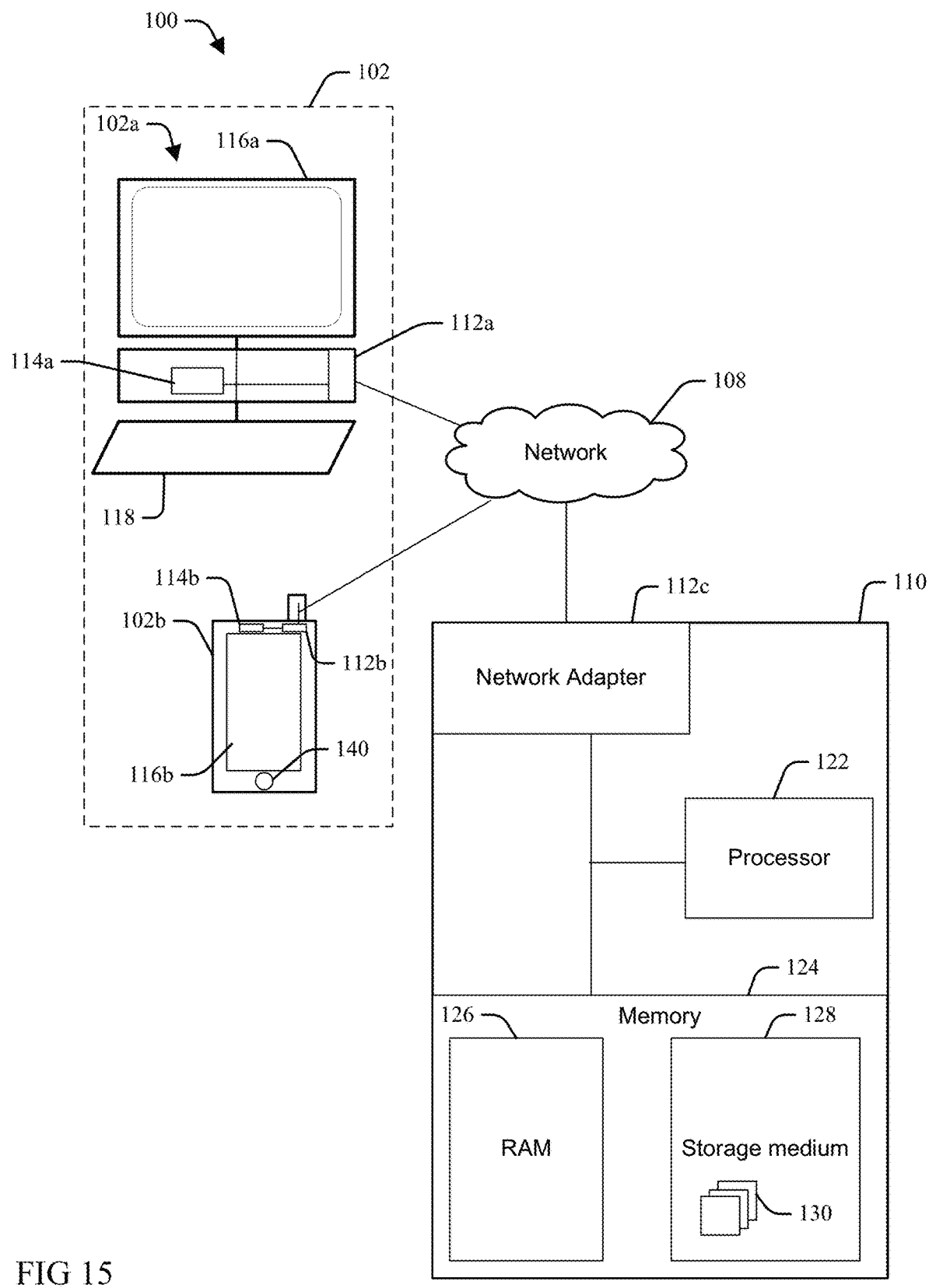
FIG. 15 is a graphic illustration of an example of another implementation according to an embodiment of the present invention.

FIG. 15 is a schematic, graphic illustration of an embodiment of a system 100 according to the present invention. The system 100 includes one or more local computing devices 102, such as, for example, a desktop computer 102a or smartphone 102b; other examples include a laptop computer, personal digital assistant, tablet, cellular telephone, body worn device, or the like. Lines of the schematic illustrate communication paths between the devices 102a, 102b and a computer server 110 over a network 108, and between respective components within each device. Communication paths between the local computing devices 102a and 102b and the computer server 110 over the network 108 include respective network interface devices 112a, 112b, and 112c within each device, such as a network adapter, network interface card, wireless network adapter, and the like.

In the present example, the smartphone 102b transfers first and second data inputs from the user (such as input by the member through a GUI display device 116b) over a network 108 to a computer server 110 via their respective network interface adapters 112b and 112c. The computer server 110 includes a processor 122 configured (thus, the "configured processor" discussed above) with instructions stored in a memory 124. The processor 122 of the computer server 110 and the processors 114a and 114b of the local computing devices include, for example, a digital processor, an electrical processor, an optical processor, a microprocessor, a single core processor, a multi-core processor, distributed processors, parallel processors, clustered processors, combinations thereof and the like. The mobile device 102b may also include a microphone 140, which may receive verbal commands from a user. The memory 124 includes a computer readable random access memory (RAM) 126 and a computer readable storage medium 128.

The local computing devices 102 include one or more input devices 118, such as a keyboard, mouse, microphone, touch screen, etc., and wherein the processor 114a drives display devices 116a to present data values as described above with respect to FIG. 1.

The computer readable storage medium 128 can be a tangible device that retains and stores instructions for use by an instruction execution device, such as the processor 122. The computer readable storage medium 128 may be, for example, but is not limited to, an electronic storage device, a magnetic storage device, an optical storage device, an electromagnetic storage device, a semiconductor storage device, or any suitable combination of the foregoing. A computer readable storage medium 128, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be transmitted to respective computing/processing devices from the computer readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface devices 112a, 112b and 112c in each device exchange (receive and send) computer readable program instructions from and through the network 108 and, include storage in or retrieval from the computer readable storage medium 128.

Computer readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as Java®, Javascript®, C, C#, C++, Python, Cython, F#, PHP, HTML, Ruby, and the like. (JAVA and JAVASCRIPT are trademarks of Oracle America, Inc., in the United States or other countries.)

The computer readable program instructions may execute entirely on the computer server 110, partly on the computer server 110, as a stand-alone software package, partly on the computer server 110 and partly on the local computing devices 102 or entirely on the local computing devices 102. For example, the local computing devices 102 can include a web browser that executes HTML instructions transmitted from the computer server 110, and the computer server executes JAVA instructions that construct the HTML instructions. In another example, the local computing devices 102 include a smartphone application, which includes computer readable program instructions to perform the processes described above.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

The computer system 100 is operational with numerous other computing system environments or configurations. Examples of well-known computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, a service provider may perform process steps of the invention on a subscription, advertising, and/or fee basis. That is, a service provider could offer to integrate computer-readable program code into the computer system 100 to enable the computer system 100 to perform the processes of FIG. 1 discussed above. The service provider can create, maintain, and support, etc., a computer infrastructure, such as components of the computer system 100, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 110, from a tangible computer-readable medium device 128; (2) adding one or more computing devices to the computer infrastructure 100; and (3) incorporating and/or modifying one or more existing systems 110 of the computer infrastructure 100 to enable the computer infrastructure 100 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

in response to validating login into a service provider account interface via entry of password and identity credential, presenting, by one or more processors coupled with memory, a plurality of different password-less sign-in alternatives for selection for a subsequent future log-in to the service provider account interface;

in response to a selection of a process that verifies presence of a registered universal serial bus device within a universal serial bus port as a password-less sign-in alternative selected from the plurality of different password-less sign-in alternatives, generating, by the one or more processors, a first data request presented via a graphical user interface window that is associated with the selected password-less sign-in alternative;

determining, by the one or more processors, that a first data input comprising a personal identification number code for the universal serial bus device received via the graphical user interface window in response to the first data request satisfies a requirement of the first data request;

in response to determining that the first data input satisfies the first data request, generating, by the one or more processors, a second data request for a security key for the universal serial bus device based at least on a confirmation of the one or more personal identification number code inputs from the first data input;

determining, by the one or more processors, that a second data input received in response to the second data request satisfies a requirement of the second data request;

in response to the determination that the second data input satisfies the second data request, enabling, by the one or more processors, the selected password-less sign-in alternative for a subsequent login into the service provider account interface, wherein the subsequent login into the service provider account interface via the enabled selected password-less sign-in alternative does not require a password; and notifying, by the one or more processors, to use the enabled selected password-less sign-in alternative for the subsequent login into the service provider account interface.

2. The method of claim 1, wherein the plurality of different password-less sign-in alternatives are selected from a process that texts a sign in passcode to a mobile phone, a service provider entity mobile app or, a biometric authentication structure on a mobile device, a process that calls a mobile phone to transmit audio data comprising a passcode, the process that verifies presence of the registered universal serial bus device within the universal serial bus port, and a process that sends a sign in passcode to an email address.

3. The method of claim 2, further comprising:

generating, by the one or more processors, the second data request to enable the universal serial bus device of the password-less sign-in alternative determining, by the one or more processors, that the second data input received in response to the second data request satisfies the second data request; and wherein the enabling the universal serial bus device is completed by confirming receipt of a text message.

4. The method of claim 2, wherein at least one of selected one of the plurality of different password-less sign-in alternatives is the process that texts the sign in passcode to the mobile phone;

wherein the first data input for the first data request includes a selection of a telephone number; and the method further comprising:

in response to engaging the process that texts the sign in passcode to the mobile phone for the subsequent login into service provider account interface, sending, by the one or more processors, a text message that comprises a passcode to the telephone number;

presenting, by the one or more processors, a passcode entry field within a graphical user interface window; and logging, by the one or more processors, to the service provider account interface in response to populating the passcode entry field with the passcode.

5. The method of claim 2, wherein at least one of selected one of the plurality of different password-less sign-in alternatives is the service provider entity mobile app, the method further comprising:

in response to engaging the enabled service provider entity mobile app for the subsequent login into service provider account interface, directing, by the one or more processors, to log in to the service provider entity mobile app;

presenting, by the one or more processors, an approval button within a window displayed within the service provider entity mobile app; and logging, by the one or more processors, to the service provider account interface in response to selecting the approval button via a graphical user interface routine.

6. The method of claim 2, wherein at least one of selected one of the plurality of different password-less sign-in alternatives is the biometric authentication structure on a mobile device;

wherein the first data request input is a first authentication output of a native biometric routine of the mobile device that authenticates an identity indicia;

the method further comprising:

in response to engaging the enabled selected biometric authentication structure on a mobile device for the subsequent login into service provider account interface, driving, by the one or more processors, a display screen of the mobile device to display a quick response code that comprises a uniform resource location hyperlink;

in response to a browser of the mobile device navigating to the uniform resource location, using, by the one or more processors, the native biometric routine of the mobile device to generate a second authentication output of the native biometric routine of the mobile device that authenticates the identity indicia; and logging, by the one or more processors, to the service provider account interface in response to the second authentication output.

7. The method of claim 2, wherein at least one of selected one of the plurality of different password-less sign-in alternatives is the process that calls the mobile phone to transmit audio data comprising the passcode;

wherein the first data request input is a selection of a telephone number;

the method further comprising:

in response to engaging the enabled process that calls the mobile phone to transmit audio data comprising the passcode for the subsequent login into service provider account interface, generating, by the one or more processors, an automated telephone call to the telephone number that includes an audio message comprising a recitation of a passcode;

presenting, by the one or more processors, a passcode entry field within a graphical user interface window; and logging, by the one or more processors, to the service provider account interface in response to populating the passcode entry field with the passcode.

8. The method of claim 2, wherein at least one of selected one of the plurality of different password-less sign-in alternatives is the process that verifies presence of the registered universal serial bus device within the universal serial bus port;

wherein the first data request input is a first output of a native security application of the registered universal serial bus device that verifies that a user is authorized to use the universal serial bus device;

the method further comprising:

in response to the user engaging the enabled process that verifies presence of the registered universal serial bus device within the universal serial bus port for the subsequent login of the user into the service provider account interface, verifying, by the one or more processors, that the registered universal serial bus device is inserted into a universal serial bus port of a programmable device from which the user is requesting the subsequent login; and logging, by the one or more processors, the user in to the service provider account interface in response to a second output of a native security application of the registered universal serial bus device that is received from the universal serial bus port and that verifies that the user is authorized to use the universal serial bus device.

9. The method of claim 2, wherein at least one of selected one of the plurality of different password-less sign-in alternatives is the process that sends the sign in passcode to the email address registered;

wherein the first data request input is a selection of an email address; and the method further comprising:

in response to engaging the enabled process that sends the sign in passcode to the email address registered for the subsequent login into service provider account interface, sending, by the one or more processors, an email message that comprises a passcode to the selected email address;

presenting, by the one or more processors, a passcode entry field within a graphical user interface window; and logging, by the one or more processors, to the service provider account interface in response to populating the passcode entry field with the passcode.

10. The method of claim 2, further comprising:
integrating, by the one or more processors, computer-readable program code into a computer system comprising a processor of the one or more processors, a computer-readable memory in circuit communication with the processor, and a computer-readable storage medium in circuit communication with the processor;

wherein the processor executes program code instructions stored on the computer-readable storage medium via the computer-readable memory and thereby performs the presenting the plurality of different password-less sign-in alternatives, the generating the first data request, the determining that the first data input satisfies the requirement, the enabling the selected password-less sign-in alternative for the subsequent login into the service provider account interface, and the notifying to use the enabled selected password-less sign-in alternative for the subsequent login into the service provider account interface.

11. The method of claim 10, wherein the computer-readable program code is provided as a service in a cloud environment.

12. A system, comprising:
a processor,
a computer-readable memory in circuit communication with the processor;
a computer-readable storage medium in circuit communication with the processor; and wherein the processor executes program instructions stored on the computer-readable;
storage medium via the computer-readable memory and thereby:
in response to validating a login into a service provider account interface via entry of password and identity credential, presents a plurality of different password-less sign-in alternatives for selection for a subsequent future login to the service provider account interface;
in response to a selection of a process that verifies presence of a registered universal serial bus device within a universal serial bus port as a password-less sign-in alternative selected from the plurality of different password-less sign-in alternatives, generates a first data request presented via a graphical user interface window that is associated with the selected password-less sign-in alternative;
determines that a first data input comprising a personal identification number code for the universal serial bus device received via the graphical user interface window in response to the first data request satisfies a requirement of the first data request;
in response to determining that a first data input satisfies the first data request, generates a second data request for a security key for the universal serial bus device based at least on a confirmation of the one or more personal identification number code inputs from the first data input;

determines that a second data input received in response to the second data request satisfies a requirement of the second data request;

in response to the determination that the second data input satisfies the second data request, enables the selected password-less sign-in alternative for a subsequent login into the service provider account interface, wherein the subsequent login into service provider account interface via the enabled selected password-less sign-in alternative does not require the password; and notifies to use the enabled selected password-less sign-in alternative for the subsequent login into the service provider account interface.

13. The system of claim 12, wherein the plurality of different password-less sign-in alternatives are selected from a process that texts a sign in passcode to a mobile phone, a service provider entity mobile app, a biometric authentication structure on a mobile device, a process that calls a mobile phone to transmit audio data comprising a passcode, the process that verifies presence of the registered universal serial bus device within the universal serial bus port, and a process that sends a sign in passcode to an email address.

14. The system of claim 13, wherein the selected one of the plurality of different password-less sign-in alternatives is the process that texts the sign in passcode to the mobile phone;
wherein the first data input for the first data request input is includes a selection of a telephone number; and
wherein the processor executes the program instructions stored on the computer-readable;
storage medium via the computer-readable memory and thereby:
in response to engaging the process that texts the sign in passcode to the mobile phone for the subsequent login into service provider account interface, sends a text message that comprises a passcode to the telephone number; and
presents a passcode entry field within a graphical user interface window; and
logs to the service provider account interface in response to populating the passcode entry field with the passcode.

15. The system of claim 13, wherein at least one of selected one of the plurality of different password-less sign-in alternatives is the service provider entity mobile app, and wherein the processor executes the program instructions stored on the computer-readable storage medium via the computer-readable memory and thereby:
in response to engaging the enabled service provider entity mobile app for the subsequent login into the service provider account interface, directs to log in to the service provider entity mobile app;
presents an approval button within a window displayed within the service provider entity mobile app; and
logs in to the service provider account interface in response to selecting the approval button via a graphical user interface routine.

16. The system of claim 13, wherein at least one of selected one of the plurality of different password-less sign-in alternatives is the biometric authentication structure on a mobile device;
wherein the first data request input is a first authentication output of a native biometric routine of the mobile device that authenticates an identity indicia;

wherein the processor executes the program instructions stored on the computer-readable storage medium via the computer-readable memory and thereby:

in response to engaging the enabled selected biometric authentication structure on a mobile device for the subsequent login into the service provider account interface, drives a display screen of the mobile device to display a quick response code that comprises a uniform resource location hyperlink;

in response to a browser of the mobile device navigating to the uniform resource location, uses the native biometric routine of the mobile device to generate a second authentication output of the native biometric routine of the mobile device that authenticates the identity indicia; and logs in to the service provider account interface in response to the second authentication output.

17. A computer program product, comprising:

a computer-readable storage medium having computer-readable program code embodied therewith, wherein the readable storage medium is not a transitory signal per se, the computer-readable program code comprising instructions for execution by a processor that cause the processor to:

in response to validating login into a service provider account interface via entry of password and identity credential, present a plurality of different password-less sign-in alternatives for selection for a subsequent future login to the service provider account interface;

in response to a selection of a process that verifies presence of a registered universal serial bus device within a universal serial bus port as a password-less sign-in alternative selected from the plurality of different password-less sign-in alternatives, generate a first data request presented via a graphical user interface window that is associated with the selected password-less sign-in alternative;

determine that a first data input comprising a personal identification number code for the universal serial bus device received via the graphical user interface window in response to the first data request satisfies a requirement of the first data request;

in response to determining that the first data input satisfies the first data request, generate a second data request for a security key for the universal serial bus device based at least on a confirmation of the one or more personal identification number code inputs from the first data input;

determine that a second data input received in response to the second data request satisfies a requirement of the second data request;

in response to the determination that the second data input satisfies the second data enable the selected password-less sign-in alternative for a subsequent login into the service provider account interface, wherein the subsequent login into service provider account interface via the enabled selected password-less sign-in alternative does not require the password; and notify to use the enabled selected password-less sign-in alternative for the subsequent login into the service provider account interface.

18. The computer program product of claim 17, wherein the plurality of different password-less sign-in alternatives are selected from a process that texts a sign in passcode to a mobile phone, a service provider entity mobile app, a biometric authentication structure on a mobile device, a process that calls a mobile phone to transmit audio data comprising a passcode, the process that verifies presence of the registered universal serial bus device within the universal serial bus port, and a process that sends a sign in passcode to an email address registered.

19. The computer program product of claim 18, wherein at least one of selected one of the plurality of different password-less sign-in alternatives is the process that calls the mobile phone to transmit audio data comprising the passcode;

wherein the first data input for the first data request includes a selection of a telephone number; and wherein the computer-readable program code instructions for execution by the processor further cause the processor to:

in response to engaging the process that calls the mobile phone to transmit audio data comprising the passcode for the subsequent login into service provider account interface, generate an automated telephone call to the telephone number that includes an audio message comprising a recitation of a passcode; and present a passcode entry field within a graphical user interface window; and log in to the service provider account interface in response to populating the passcode entry field with the passcode.

20. The computer program product of claim 18;

wherein the first data input for the first data request includes a first output of a native security application of the registered universal serial bus device that verifies that a user is authorized to use the universal serial bus device;

wherein the computer-readable program code instructions for execution by the processor further cause the processor to:

in response to the user engaging the enabled process that verifies presence of the registered universal serial bus device within the universal serial bus port for the subsequent login of the user into the service provider account interface, verify that the registered universal serial bus device is inserted into a universal serial bus port of a programmable device from which the user is requesting the subsequent login; and log the user in to the service provider account interface in response to a second output of a native security application of the registered universal serial bus device that is received from the universal serial bus port and that verifies that the user is authorized to use the universal serial bus device.

* * * * *